Oct. 24, 1961     J. B. THOMSON ET AL     3,005,665
ANTI-FRICTION BEARINGS
Filed March 3, 1958
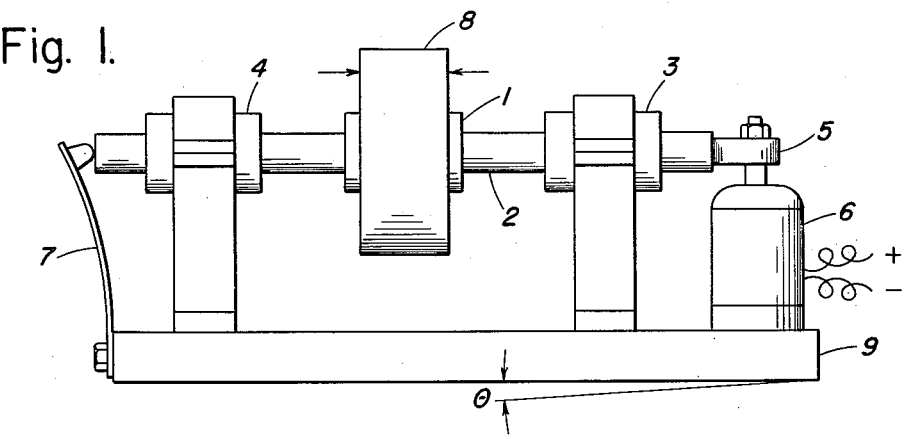
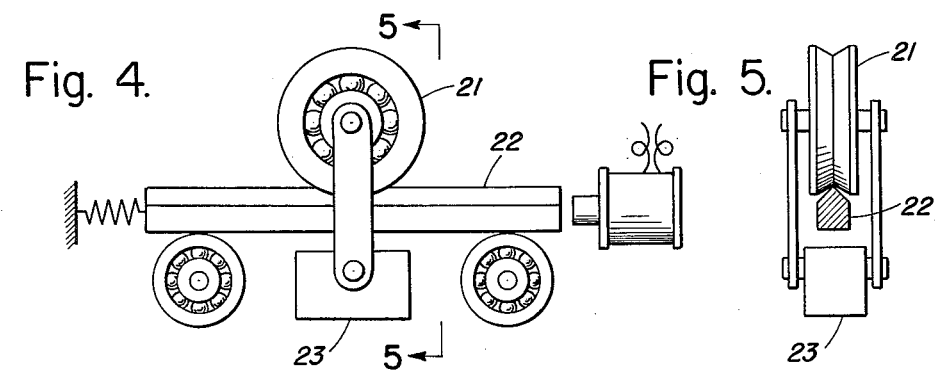
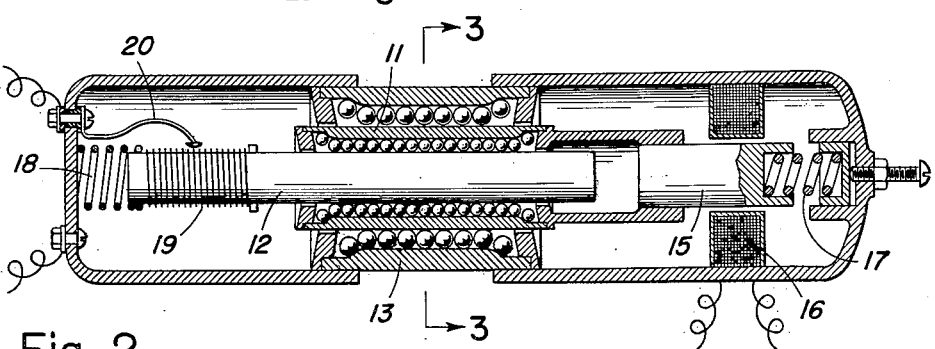
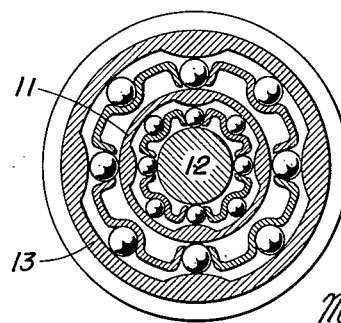
INVENTORS
John B. Thomson
Robert C. Magee
BY
Morgan, Finnegan, Durham & Pine
ATTORNEYS

United States Patent Office 3,005,665
Patented Oct. 24, 1961

3,005,665
ANTI-FRICTION BEARINGS
John B. Thomson, 1029 Plandome Road, Manhasset, N.Y., and Robert C. Magee, Manhasset, N.Y.; said Magee assignor to said Thomson
Filed Mar. 3, 1958, Ser. No. 718,702
3 Claims. (Cl. 308—6)

This invention relates to improved anti-friction bearings for linear motion.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof illustrate one embodiment of the invention, and together with the description, serve to explain the principles of the invention.

Of the drawings:

FIGURE 1 is a longitudinal vertical section taken through a typical, illustrative and preferred embodiment of the present invention;

FIGURE 2 is a similar view through a modified embodiment of the present invention;

FIGURE 3 is a cross section taken on the line 3—3 of FIGURE 2;

FIGURE 4 is a fragmentary side elevation of a further modification of the invention; and, FIGURE 5 is an end view of the form shown in FIGURE 4.

The present invention has for an object the provision of a bearing assembly for linear motion which has a greatly reduced friction as compared with previously known linear or reciprocating bearing structures. A further object is the provision of a linear bearing structure in which the intermittent sticking or catching which is present in conventional constructions is substantially eliminated and which is therefore almost free of hysteresis and erratic movement. Still another object is the provision of a linear anti-friction bearing which is especially useful in instruments and in other applications in which the utmost freedom of linear movement is required coupled with dependable, repeatable operation so that such a structure may be used for the measurement of a linearly acting force or force-component.

Heretofore, linear ball bearings, such as those shown and described in the prior patent to Magee No. 2,628,135, and its commercial counterparts have been widely and extensively used in extremely sensitive devices, such as accelerometers, G-switches, and other inertial components of aircraft and other vehicles, but have been subject to detrimental stickiness and erratic performance even to the extent that the word "sticktion" has been coined to describe the slight unpredictable catchiness of such conventional linear ball bearing structures.

Although other types or arrangements of ball, roller or other bearings may be used which are suitable for linear motion, the preferable forms shown and described herein utilize linear ball bearings of the recirculating type comprising three or more oblong ball circuits each having one of its straight portions in bearing contact, and the remainder of the circuit in relief, as illustrated in the disclosure of the patent to Magee No. 2,628,135. Bearings of this type are extremely compact and light in weight and their normally good anti-friction characteristics for many purposes are tremendously improved by the present invention, so that they are entirely suited for the most sensitive applications, and they then perform excellently and with the greatest degree of reliability and repeatability under even small force components.

The performance of bearings of this general type can be evaluated by determining the minimum angle of a shaft down which the bearing and its load will start and continue to roll. For example, a "high precision" type of linear ball bearing will start and continue to roll down a one-quarter inch diameter shaft at an angle of 20 minutes when loaded with a three ounce mass. However, when improved by the features of the present invention the same linear ball bearings will start and continue to roll down a similar shaft which is inclined to the horizontal only to the extent of one minute. This reduction in starting and rolling friction and in catchiness is such as to enable the improved bearing to start and continue to roll when subject to a force of only 0.00029 G, or approximately a twenty-fold improvement over the best prior conventional arrangements. There has thus been provided a linear freedom which is far in excess of any previously known arrangement of mechanically moving parts.

Another important feature of this invention is that it very simply enables the position or motion of the supported member to be biased or changed without direct application of force to it.

The present invention, in its simplest aspect, comprises a combination which includes a linear shaft or other supporting linear guide which is mounted for rapid reciprocation through a small amplitude and suitable mechanical or electrical means for reciprocating the shaft or guide, together with a linear motion ball bearing sleeve supported on or supporting said shaft or guide. In some instances, the shaft or guide may be the member which is mounted on a base member, while the linear ball bearing carries a supported member and which can act as the member having substantial linear movement with respect to the shaft or guide, but in other applications of the invention, the linear ball bearing member may be mounted on a base member and the shaft or guide may have relatively large linear motion with respect to the base member, the ball bearing member or the shaft or guide always being rapidly subjected to linear movement or reciprocation within a small amplitude with respect to the other member.

In any conventional linear bearing, the relatively movable parts periodically come to a dead stop, and the friction coefficient of the mating parts is thereby increased because the static friction coefficient is much greater than the rolling friction coefficient. This difference is sometimes known as the "break-away friction." By superimposing a relatively fast reciprocation of one or the other of the bearing parts through a small amplitude on the larger relative linear movement of the shaft and bearing sleeve, the structure of the present invention keeps the balls activated at all times, and they are therefore never subject to the static condition which otherwise causes the relatively high starting or rolling friction.

Additionally, in linear ball bearings of the recirculating type, the balls often tend to rub on each other, thereby creating an additional and irregular frictional loading of the bearing. Also, in commercial linear ball bearings, the balls are of very slightly different sizes, and sometimes tend to bind in their raceways, due to some of the balls overtaking others and trying to overrun a preceding ball. Ball activation maintains a separation of the balls which eliminates both of these causes of friction.

In linear ball bearings where the balls are not held individually by a retainer or separator and are guided by a groove or raceway, manufacturing tolerances prohibit perfect guidance and the balls tend to become staggered in their raceways and do not remain in a straight line behind each other. As the balls reach a turn in an oblong circuit, or come under load in a rounded circuit, the staggered condition must straighten out and this action causes binding, sticking and catchiness in the operation of the bearing. The mechanical activation of the balls according to the present invention keeps balls moving at all times, and centrifugal force keeps all of the balls on the outside of the turns and one behind the other so that catchiness due to the staggering of the balls is eliminated.

It will be understood that the foregoing general description and the following detailed description as well are exemplary and explanatory of the invention but are not restrictive thereof.

Referring now in detail to the accompanying drawings wherein FIGURE 1 shows a preferred and simple embodiment of the present invention there is provided a linear ball bearing 1 of the general type disclosed in Magee Patent No. 2,628,135, mounted on a shaft 2. The shaft is mounted in similar linear ball bearings 3 and 4 and is rapidly reciprocated through a small amplitude by the cam 5 which is driven by the motor 6 and opposed by the spring 7. In this arrangement it is desired to have the mass 8 move linearly back and forth along the shaft 2 with the least possible external force applied as indicated by the arrows or by the slightest change of angle $\theta$ of the base 9. For optimum results under varying conditions the stroke of the shaft 2 can be varied by changing the eccentric lift of the cam 5 and the speed of the motor 6.

FIGURES 2 and 3 show a different arrangement of the invention wherein a linear ball bearing 11 is linearly moved and reciprocated relative to the shaft 12 which serves as the mass of an inertial sensing device. The linear ball bearing 11 is mounted within a larger linear ball bearing 13 which supports it and provides anti-friction action for the reciprocation of ball bearing 11 which is accomplished by feeding electrical impulses (A.C. or pulsating D.C.) at the desired frequency into the solenoid which is comprised of a core 15 and a surrounding coil 16. This action, when opposed by the adjustable spring 17, will produce a reciprocation of linear bearing 11 at the desired speed and stroke. The mass 12 is held in an axial position by the spring 18 and is provided with a potentiometer coil 19 and an electrical pickoff 20 which changes the resistance of the potentiometer circuit with the slightest linear motion of the mass 12.

If each of the two strokes of the reciprocation of bearing 11 in FIGURE 2 caused by the interaction of the solenoid and spring are of equal velocity, the mass 12 will have no tendency to move due to its inertia. The position of mass 12 can be moved and its balance relationship with spring 18 biased by changing the stroke rate in one direction as compared with the other by altering the electro-mechanical characteristics of the solenoid-spring reciprocating mechanism.

FIGURES 4 and 5 illustrate another arrangement of the invention wherein a ball bearing 21 is mounted on and is free to traverse back and forth on rail 22, while supporting the mass 23, which mass remains substantially stationary unless subjected to a moving force such as gravity or other component force. In this embodiment, the rail 22 is reciprocated, as in FIGURE 1 or 2, at a relatively high frequency which enables the bearing to roll back and forth along the rail with nearly zero friction.

The invention in its broader aspects is not limited to the specific mechanisms shown and described but departures may be made therefrom within the scope of the accompanying claims without departing from the principles of the invention and without sacrificing its chief advantages.

What is claimed is:

1. In an inertial sensing device, the combination comprising a housing, a bearing support mounted inside said housing, a linear anti-friction bearing having a plurality of rolling anti-friction elements, means mounting said linear bearing for axial movement in said bearing support, a sensing mass carried by said linear anti-friction bearing and axially moveable with respect thereto, means for reciprocating said linear bearing at a sufficiently rapid rate and through a sufficiently small amplitude to effect substantially no relative movement between said mass and said linear bearing due to said reciprocation, said reciprocation being operative to maintain said rolling anti-friction elements in a state of motion whereby the force required to move said mass relative to said linear bearing is substantially reduced.

2. A bearing assembly adapted for use in inertial sensing devices comprising a linear guide member, a base support for said guide member, means mounting said guide member for axial travel relative to said support, a supporting member mounted on said guide by rolling anti-friction elements for linear movement relative to said guide member, a sensing mass carried by said supporting member, and means for reciprocating one of said members at a sufficiently rapid rate through a sufficiently small amplitude to effect substantially no relative movement between said guide and said supporting member by said reciprocation, said reciprocation being operative to maintain said rolling anti-friction elements in a state of motion whereby the force required to move said mass relative to said guide is substantially reduced.

3. A bearing assembly adapted for use in an inertial sensing device comprising a linear shaft, a support for said shaft, means mounting said shaft on said support for linear travel relative to said support, a linear anti-friction bearing having a plurality of rolling anti-friction elements, means mounting said linear bearing on said shaft for axial travel therealong, a sensing mass carried by said linear bearing, and means for rapidly reciprocating said shaft at a sufficiently rapid rate and through a sufficiently small amplitude to effect substantially no relative movement between said shaft and said linear bearing by said reciprocation, said reciprocation being operative to maintain said rolling anti-friction elements in a state of motion whereby the force required to move said mass along said shaft is substantially reduced.

References Cited in the file of this patent

UNITED STATES PATENTS

| | | |
|---|---|---|
| 1,512,804 | Roucka | Oct. 21, 1924 |
| 2,628,135 | Magee | Feb. 10, 1953 |